United States Patent Office 3,534,049
Patented Oct. 13, 1970

3,534,049
1 - SUBSTITUTED - 3 - [1 - HYDROXY - N - (ARYL-SULFONYL)FORMIMIDOYL]PYRIDINES AND DERIVATIVES
Stanley C. Bell, Penn Valley, Pa., assignor to American Home Products Corporation, New York, N.Y., a corporation of Delaware
No Drawing. Filed Apr. 12, 1968, Ser. No. 721,067
Int. Cl. C07d 29/34
U.S. Cl. 260—293.4
8 Claims

ABSTRACT OF THE DISCLOSURE

3-[1 - hydroxy-N-(arylsulfonyl)formimidoyl]pyridines (I) substituted in the 1-position by the m-acetoxyphenacyl group (Id), or in the 1-position by (lower)alkyl groups (Ia) and the 1,2,5,6-tetrahydropyridinium analog (Ib) of Ia and the piperidinium analog (Ic), together with the inner salts and anion salts of (I) have central nervous system depressant activity and bronchodilator activity. Compounds (I) are prepared by reacting N-(p-tolylsulfonyl)nicotinamide (II) with the corresponding alkylating agent to form (Ia) and (Id). Compound (Ib) is made by treating (Ia) with sodium borohydride, and (Ic) is made by hydrogenating (Ib) in the presence of a catalyst.

---

This invention relates to derivatives of pyridines, and more particularly to 1-substituted 3-[1-hydroxy-N-(aryl-sulfonyl)formimidoyl]pyridines and derivatives thereof having pharmacological activity.

DESCRIPTION OF THE INVENTION

The compounds of this invention are those of Formula I:

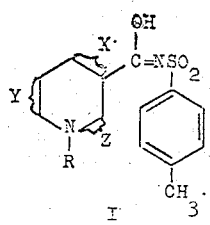

wherein (a) R is (lower)alkyl and
(i) X, Y and Z are double bonds;
(ii) X is a double bond and Y and Z are single bonds; or
(iii) X, Y and Z are single bonds; or
(b) R is

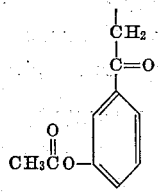

and X, Y and Z are each double bonds; an inner salt of said compound; or a pharmaceutically-acceptable salt of said compound with an anion.

As specific embodiments of this invention there are mentioned

3-[1 - hydroxy-N-(p-tolylsulfonyl)formimidoyl] - 1- methylpyridinium hydroxide, inner salt, a compound of Formula Ia:

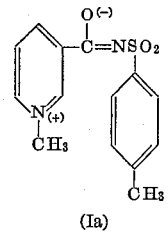

(Ia)

N-[(1 - methyl - 1,2,5,6-tetrahydropyridin-3-yl)-hydroxymethylene]-p-toluenesulfonamide, a compound of Formula Ib:

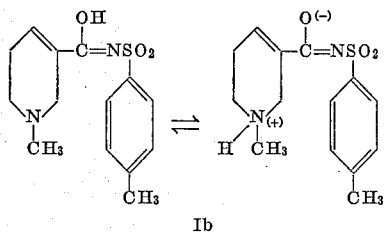

Ib

N-[(1 - methyl - 3 - piperidinyl)hydroxymethylene]-p-toluenesulfonamide, a compound of Formula Ic:

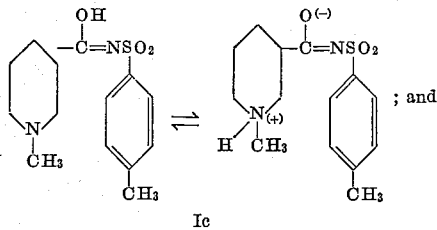

; and

Ic

1 - (m-hydroxyphenacyl) - 3 - [1-hydroxy-N-(p-tolyl-sulfonyl)formimidoyl]pyridinium bromide, acetate, a compound of Formula Id:

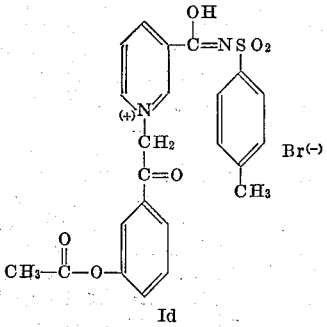

Id

When used herein and in the appended claims, the term "(lower)alkyl" contemplates hydrocarbon radicals, straight and branched chain of from 1 to about 6 carbon atoms, illustrative members of the group being methyl, ethyl, n-propyl, i-propyl, n-butyl, t-butyl, n-pentyl, n-hexyl, and the like. The term "anion" contemplates those anions which form pharmaceutically-acceptable non-toxic salts with the instant compounds, such as chloride, iodide, bromide, sulfate, hydroxide, and the like.

Compounds of Formula I are pharmacologically active in standard tests as central nervous system depressants and are of value to induce calming. The compounds of Formula I are pharmacologically active in standard tests as bronchodilating agents and are valuable to treat the symptoms of asthma, emphysema, and the like.

The compounds of this invention can be prepared from readily accessible starting materials by a number of different procedures. A convenient pathway is outlined as follows:

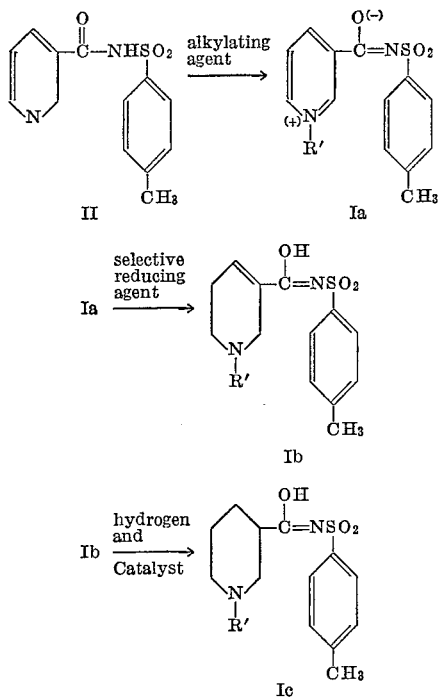

wherein R' is (lower)alkyl, especially methyl. In carrying out the above pathway, N-(p-tolylsulfonyl) nicotinamide, II, prepared as described in U.S. 2,270,201, is reacted with an appropriately-substituted N-alkylating agent, such as an alkyl halide, e.g., methyl iodide, or a reactive alkyl ester, such as dimethyl sulfate preferably in a solvent, such as acetone, until formation of the compound of Formula Ia, or a salt thereof, is substantially complete. Generally a mixture of compound II and a stoichiometrical excess of the alkylating agent such as methyl iodide in about 30 parts by weight of acetone, based on II, can be refluxed for about 18 hours, then cooled to about 25° C., whereupon compound Ia precipitates as its hydriodide. This can be suspended in water and neutralized, e.g., with sodium carbonate, to provide the inner salt Ia, which can be purified, if desired by recrystallization from water. The selectivetive reduction of Ia to Ib can be carried out with a number of reducing agents. An especially convenient selective reducing agent for the purpose is sodium borohydride, $NaBH_4$. If this is used, the compound of Formula Ia can be mixed with about 20 parts by weight of water and treated with a solution of about 0.4 parts by weight of $NaBH_4$ (based on Ia) in about 20 parts of water (based on $NaBH_4$). After about an hour at about 22° C. the mixture can be acidified, e.g., with dilute acetic acid, to about pH 6, then concentrated to about ½ volume, whereupon Ib precipitates. Ib can be purified, if desired, by recrystallization from water. Conversion of Ib to Ic can be carried out by hydrogenation in the presence of a catalyst, for example a palladium catalyst. In one manner of proceeding, Ib is mixed with about 25 parts by weight of water, about 0.2 parts by weight of 10% palladium on carbon catalyst is added to the mixture and the mixture is hydrogenated until one mole of hydrogen is consumed. The product is recovered by filtering off the catalyst, evaporating the mixture to dryness, which leaves Ic as a residue. The product can be purified, if desired, by recrystallization, e.g., from a lower alkanol, such as ethanol, or from water.

Compound Id can be prepared by the firstgeneral procedure above-outlined, substituting for the (lower)alkyl alkylating agent, e.g., methyl iodide, the corresponding m-(bromoacetyl)phenylacetate:

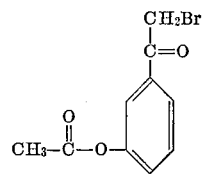

The product, Id, can be purified, if desired, by recrystallization from a lower alkanol, e.g., ethanol.

The compounds of Formula I of this invention have demonstrated pharmacological activity. In particular they have been found to exert a depressant action on the central nervous system when tested under standard and accepted pharmacological procedures in animals, such as mice and rats. They are, therefore, deemed to possess utility in experimental and comparative pharmacology and are of value to treat conditions in animals, such as valuable domestic animals, and in laboratory animals, such as mice, rats and the like, responsive to treatment with central nervous system depressant agents, such as the need to induce a calming effect.

The compounds of Formula I of this invention have been found to act as bronchodilators when tested under standard and accepted pharmacological test procedures in animals, such as guinea pigs. They are, therefore, deemed to possess utility in experimental and comparative pharmacology and are of value to treat conditions in animals, such as valuable domestic animals, and in laboratory animals, such as mice, rats, guinea pigs, and the like, responsive to treatment with bronchodilating agents, such as the symptoms of asthma and the broncho-restrictive effects of histamine-like compounds.

The compounds of Formula I of this invention may be administered either alone or in combination with other pharmacologically-active ingredients. Whether singly or in combination, they may be used in the form of solid compositions for oral administration combined, if desired, with extenders or carriers that are relatively non-toxic or inert. They may be put into tablet, capsule or powder form. On the other hand, they may be administered in liquid form as a suspension or solution in a suitable vehicle for parenteral use. By way of illustration, pharmacological action as central nervous system depressant agents in mice has been demonstrated when compounds of this invention have been administered in dosages of 12.7, 40, 127 and 400 mg./kg.

For bronchodilating purposes, in addition to the above means of administration, resort can be had to inhalation of aerosols or of solutions, e.g. 1:100 or 1:200, or of powders e.g. 10% or 25% active ingredient. By way of illustration, pharmacological action as bronchodilating agents in guinea pigs has been demonstrated at a dosage of 25 mg./kg.

DESCRIPTION OF THE PREFERRED EMBODIMENTS

The following examples are given by way of illustration.

EXAMPLE 1

3-[1-hydroxy-N-(p-tolylsulfonyl)formimidoyl-1-methylpyridinium hydroxide, inner salt A mixture of 5.0 g. of N-(p-tolylsulfonyl)nicotinamide, 25 ml. of methyliodide and 150 ml. of acetone is refluxed for 18 hr. and cooled to give 6.3 g. of the hydriodide salt of the product M.P. 207–211° C.

The HI salt is suspended in water and neutralized with sodium carbonate to give the product, inner salt, M.P., 302–304° C. (from water).

*Analysis.*—Calcd. for $C_{14}H_{14}N_2O_3S$ (percent): C, 57.80; H, 4.86. Found (percent): C, 57.89; H, 4.66.

EXAMPLE 2

N-[(1-methyl-1,2,5,6-tetrahydropyridin-3-yl)-hydroxymethylene]-p-toluene sulfonamide To a mixture of 10.0 g. of 3-[1-hydroxy-N-(p-tolylsulfonyl)formimidoyl]-1-methylpyridinium hydroxide, inner salt and 200 ml. of water is added with stirring a solution of 4.0 g. of NaBH₄ in 70 ml. of water. After one hour, when the bubbling subsides, the reaction mixture is acidified with acetic acid to about pH 6. The solution is concentrated in vacuo to ½ its volume to give 4.5 g. of solid, M.P. 220–221° C. Recrystallization from water affords pure product, M.P. 233–234° C.

*Analysis.*—Calcd. for $C_{14}H_{18}N_2O_3S$ (percent): C, 57.12; H, 6.16; N, 9.52; S, 10.89. Found (percent): C, 56.96; H, 6.02; N, 9.62; S, 11.20.

EXAMPLE 3

N-[(1-methyl-3-piperidinyl)hydroxymethylene]-p-toluenesulfonamide

A mixture of 5.5 g. of N-[(1-methyl-1,2,3,5,6-tetrahydropyridin-3-yl)hydroxymethylene] - p - toluenesulfonamide and 150 ml. of water is hydrogenated in the presence of 1.0 g. of 10% Pd on C until one mole of hydrogen is consumed. The solution is filtered from the catalyst, concentrated to dryness in vacuo and the residue is recrystallized from ethanol to give 3.0 g. of solid, M.P. 235–237° C. Recrystallization from water affords pure white product, M.P. 245–247° C.

*Analysis.*—Calcd. for $C_{14}H_{20}N_2O_3S$ (percent): C, 56.73; H, 6.80; N, 9.45; S, 10.82. Found (percent): C, 56.63; H, 6.95; N, 9.28; S, 10.50.

EXAMPLE 4

1-(m-hydroxyphenacyl)-3-[1-hydroxy-N-(p-tolylsulfonyl)formimidoyl]pyridinium bromide, acetate A mixture of 7.7 g. of m-(bromoacetyl)-phenylacetate, 6.8 g. of N-(p-tolylsulfonyl)nicotinamide and 200 ml. of acetone is refluxed for 2 hr. and chilled to give 10.6 g. of product, M.P. 204–206° C. Recrystallization from ethanol affords white crystalline product, M.P. 224–226° C.

*Analysis.*—Calcd. for $C_{23}H_{21}BrN_2O_6S$ (percent): C, 51.79; H, 3.97; N, 5.25; S, 6.01. Found (percent): C, 51.77; H, 3.70; N, 5.01; S, 6.04.

In evaluating the instant compounds for pharmacological activity, they are tested in vivo by standard methods with the following results.

The compound is administered to three mice (CF–1 14 to 24 grams) at each of the following doses: 400, 127, 40 and 12.7 mg./kg.

The animals are watched for signs of general stimulation, general depression and autonomic activity and the observations are evaluated by methods described in detail in Turner, Screening Methods in Pharmacology, Academic Press, New York, p. 80 (1965), in the section entitled "A Test Group for Central Depressants."

3-[1-hydroxy - N - (p-tolylsulfonyl)formimidoyl]-1-methylpyridinium hydroxide, inner salt, administered intraperitoneally in saline (i.p.), caused decreased motor activity at 40 mg./kg., and decreased respiration and loss of righting reflex at 127 mg./kg.; there were no deaths at the highest dose used, 400 mg./kg.; N-[1-methyl-1,2,5,6-tetrahydropyridin - 3 - yl)-hydroxymethylene]-p-toluenesulfonamide, i.p., caused decreased motor activity at 40 mg./kg., ataxia at 400 mg./kg. and decreased respiration at 127 mg./kg.; there were no deaths at the highest dose used, 400 mg./kg.; 1-(m-hydroxyphenacyl)-3-[1-hydroxy-N-(p-tolylsulfonyl)formimidoyl]pyridinium bromide, acetate, caused decreased motor activity at 12.7 mg./kg.; and ataxia and decreased respiration at 400 mg./kg.; there were no deaths at the highest dose used, 400 mg./kg.

In a standard test for bronchodilator activity [modified from Siegmund et al., J. Pharmacol., 90, 254 (1947)] the ability of the compound to protect a guinea pig against the bronchoconstrictor effects of a histamine mist is determined. A 0.2% (base) histamine diphosphate solution is atomized and sprayed into a closed chamber for 60 seconds. The guinea pig is then placed into the chamber and observed for asphyxial effects. When convulsions are iminent, the pig is removed from the chamber and allowed to recover. The time from placing the pig in the chamber until convulsions are iminent is recorded and is designated pre-convulsion time. Five pigs are used and control times are obtained for each pig in the morning. Only pigs having control times in the range of 50–100 seconds are used in the test. After a 3.5 to 4 hour recovery period the pigs are administered the drug intraperitoneally and 15 minutes later are again exposed to the histamine aerosol. An animal that can withstand 3 times its morning preconvulsion time is considered completely protected. Individual control (C) and post drug convulsion time (T) are recorded and an activity value calculated by the formula, $(T/C)$. A mean $(T/C)$ value greater than 1.2 indicates activity.

In this test, N-[1-methyl - 1,2,5,6 - tetrahydropyridin-3 - yl)hydroxymethylene]-p-toluenesulfonamide, administered i.p. in saline at 25 mg./kg. had a $T/C$ of 1.44.

I claim:
1. A compound of the group consisting of 3-[1-hydroxy-N (p-tolylsulfonyl) form imidoyl]-1-lower alkyl pyridinium hydroxide, inner salt.
2. A compound as defined in claim 1 which is 3-[1-hydroxy - N - (p - tolylsulfonyl)formimidoyl]-1-methylpyridinium hydroxide, inner salt.
3. A compound of the group consisting of N-[(1-lower alkyl - 1,2,5,6 - tetrahydropyridin-3-yl)-hydroxymethylene]-p-toluenesulfonamide.
4. A compound as defined in claim 3 which is N-[1-methyl - 1,2,5,6 - tetrahydropyridin-3-yl)-hydroxymethylene]-p-toluenesulfonamide.
5. A compound of the group consisting of N-[(1-lower alkyl - 3-piperidinyl)hydroxymethylene]-p-toluenesulfonamide.
6. A compound as defined in claim 5 which is N-[(1-methyl - 3 - piperidinyl)hydroxymethylene]-p-toluenesulfonamide.
7. A salt of the formula

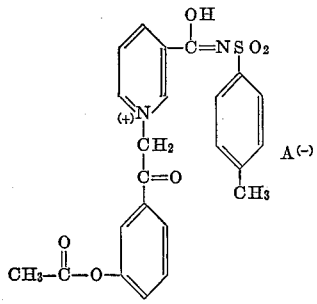

wherein $A^{(-)}$ represents a pharmaceutically acceptable anion.

8. A compound as defined in claim 7 which is 1-(m-hydroxyphenacyl) - 3 - [1-hydroxy-N-(p-tolylsulfonyl)formimidoyl]-pyridinium bromide, acetate.

References Cited

Chemical Abstracts, 660:9185a, Albrecht et al., April 1964.

HENRY R. JILES, Primary Examiner

S. D. WINTERS, Assistant Examiner

U.S. Cl. X.R.

260—294.8; 424—267, 263